United States Patent
Lawless et al.

(10) Patent No.: US 9,970,122 B2
(45) Date of Patent: May 15, 2018

(54) USE OF A DISULFIDE/DITHIOL COMPOUND IN A SEAL FOR ANODIZED ALUMINUM

(71) Applicant: THE BOEING COMPANY, Chicago, IL (US)

(72) Inventors: Lawrence M. Lawless, Chesterfield, MO (US); Bruce M. Griffin, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 48 days.

(21) Appl. No.: 14/851,888

(22) Filed: Sep. 11, 2015

(65) Prior Publication Data

US 2016/0251771 A1    Sep. 1, 2016

Related U.S. Application Data (60) Provisional application No. 62/121,618, filed on Feb. 27, 2015.

(51) Int. Cl.
| | | |
|---|---|---|
| *C25D 11/18* | (2006.01) | |
| *C25D 11/24* | (2006.01) | |
| *C09K 15/30* | (2006.01) | |
| *C23F 11/16* | (2006.01) | |

(52) U.S. Cl.
CPC .......... *C25D 11/246* (2013.01); *C09K 15/30* (2013.01); *C23F 11/161* (2013.01); *C25D 11/18* (2013.01)

(58) Field of Classification Search
CPC ............................ C25D 11/246; C23F 22/161
See application file for complete search history.

(56) References Cited

U.S. PATENT DOCUMENTS

| | | | | |
|---|---|---|---|---|
| 5,980,723 A * | 11/1999 | Runge-Marchese | ..... | C09D 5/24 205/316 |
| 6,410,197 B1 * | 6/2002 | Bellino | ................ | C25D 11/18 428/472.2 |
| 7,662,241 B2 * | 2/2010 | Sinko | ................ | C09D 5/086 106/14.05 |
| 2003/0230363 A1 * | 12/2003 | Sturgill | ................ | C23C 22/83 148/243 |
| 2004/0005478 A1 * | 1/2004 | Kendig | ................ | C09D 5/08 428/689 |
| 2004/0035498 A1 * | 2/2004 | Kinlen | ................ | C08F 2/46 148/250 |
| 2007/0261765 A1 | 11/2007 | Kendig et al. | | |

(Continued)

FOREIGN PATENT DOCUMENTS

CN    101792922 A    8/2010

OTHER PUBLICATIONS

Gabriela Telias (Authorized Officer), International Search Report and Written Opinion dated Dec. 2, 2015, PCT Application No. PCT/US2015/051722, filed Sep. 23, 2015, pp. 1-15.

(Continued)

*Primary Examiner* — David P Turocy
(74) *Attorney, Agent, or Firm* — MH2 Technology Law Group LLP (57) ABSTRACT

Provided is a method for sealing an article with a non-chrome corrosion inhibitor seal. The method may include applying an aqueous-based suspension comprising a thiol-containing corrosion inhibitor on a surface of an anodized substrate.

21 Claims, 8 Drawing Sheets

(56) References Cited

U.S. PATENT DOCUMENTS

| | | | |
|---|---|---|---|
| 2008/0317962 A1* | 12/2008 | Hayes | B05D 7/16 |
| | | | 427/409 |
| 2010/0285309 A1 | 11/2010 | Barriau et al. | |
| 2010/0314004 A1* | 12/2010 | Manavbasi | C23C 22/34 |
| | | | 148/274 |
| 2014/0315004 A1* | 10/2014 | Kinlen | C09D 5/086 |
| | | | 428/212 |
| 2015/0191604 A1 | 7/2015 | Lawless et al. | |

OTHER PUBLICATIONS

Whelan et al., "Corrosion Inhibitors for Anodised Aluminium", Surface & Coatings Technology, vol. 227, Feb. 28, 2013, pp. 75-83.
S K Weidmann et al., "Modification of Anodic Layers of Aluminum Alloys Using Chemical Nanotechnology", Dechema Forschungsinstitut, Jan. 1, 2012, http://kwi.dechema.de/kwi_media/F480_2012_stw-p-1968.pdf, retrieved Nov. 25, 2015, 1 page.

* cited by examiner

USE OF A DISULFIDE/DITHIOL COMPOUND IN A SEAL FOR ANODIZED ALUMINUM

CROSS-REFERENCE TO RELATED APPLICATIONS

This application claims priority to U.S. Provisional Patent Application Ser. No. 62/121,618, filed on Feb. 27, 2015, the entirety of which is incorporated herein by reference.

FIELD

Disclosed herein are non-chrome corrosion inhibiting compositions and methods of using the non-chrome corrosion inhibiting compositions as a seal for corrosion control of metals.

BACKGROUND

Corrosion is defined as the chemical or electrochemical reaction between a material, usually a metal, and its environment that produces a deterioration of the material and its properties. Corrosive attack begins on the surface of the metal. The corrosion process involves two chemical changes. The metal that is attacked or oxidized undergoes an anodic change, with the corrosive agent being reduced and undergoing a cathodic change. The tendency of most metals to corrode creates a major maintenance challenge for metals and metal products, particularly in areas where adverse environmental or weather conditions exist.

Corrosion of aluminum is a major problem for the aerospace and many other industries. One current technique to mitigate this problem involves anodization of the aluminum followed by an immersion seal. Typically, this seal involves the use of hexavalent chrome, which is increasingly regulated. Chromium-based anti-corrosive systems containing hexavalent chromium compounds have proven to be an extremely useful and versatile group of chemistries that are extensively used in aircraft metal treatment processes. They impart many beneficial anti-corrosive characteristics to metallic substrates on which they are applied and have been used extensively for the pre-treatment of metals before coating, adhesive bonding, and surface finishing.

Concern about chromium—and in particular, hexavalent chromium—in the environment has generated a need to replace chromium-based systems. Therefore environmentally preferable, commercially acceptable alternatives to chromium-based systems are a welcome addition to corrosion prevention coatings.

SUMMARY

Described herein is a method for sealing an article with a non-chrome corrosion inhibitor seal. The method includes applying an aqueous-based suspension comprising a thiol-containing corrosion inhibitor on a surface of an anodized substrate.

Also described herein is a method for preparing an aqueous-based, non-chrome corrosion inhibitor seal composition that includes a disulfide/dithiol compound. The method includes forming a mixture having a thiol-containing corrosion inhibitor and water. The method also includes agitating the mixture to form a suspension that includes nano-sized particles of the thiol-containing corrosion inhibitor.

Also described herein is an article. The article includes an anodized substrate having an anodic oxide coating. The anodic oxide coating includes a plurality of cells, each of the plurality of cells defining at least one pore. The article also includes a non-chrome corrosion-inhibitor seal disposed on the substrate. The seal includes thiol-containing corrosion inhibitor particles. At least one of the thiol-containing corrosion inhibitor particles is disposed in the at least one pore.

The particles, compositions and suspensions disclosed herein may be used as seals for providing corrosion protection and durability for articles such as components of an airplane. Use of the particles, compositions and suspensions and practice of the methods described herein may result in cost savings and improved work conditions due to use of non-chrome materials. For example, use of the particles, compositions and suspensions and practice of the methods described herein avoids conventional sodium or potassium dichromate solution for corrosion protection of anodized aluminum, reduces energy consumption; yet still provides equivalent corrosion protection performance as conventional anodic seals.

Additional advantages will be set forth in part in the description which follows, and in part will be understood from the description, or may be learned by practice thereof. The advantages will be realized and attained by means of the elements and combinations particularly pointed out in the appended claims.

It is to be understood that the foregoing general description and the following detailed description are exemplary and explanatory and are not restrictive of that which is claimed.

The accompanying drawings, which are incorporated in and constitute a part of this specification, illustrate examples and together with the description, serve to explain the principles of that which is described herein.

BRIEF DESCRIPTION OF THE DRAWINGS

FIGS. 3A-3B illustrates an aqueous-based, non-chrome corrosion inhibitor seal composition applied to an anodized article.

DETAILED DESCRIPTION

Reference will now be made in detail to the present descriptions, examples of which are illustrated in the accompanying drawings. Wherever possible, the same reference numbers will be used throughout the drawings to refer to the same or like parts.

Notwithstanding that the numerical ranges and parameters setting forth the broad scope of the descriptions are approximations, the numerical values set forth in the specific examples are reported as precisely as possible. Any numerical value inherently contains certain errors necessarily resulting from variance found in their respective testing measurements. Moreover, all ranges disclosed herein are to be understood to encompass sub-ranges subsumed therein. For example, a range of "less than 10" can include sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following is described for illustrative purposes with reference to the Figures. Those of skill in the art will appreciate the following description is exemplary in nature, and that various modifications to the parameters set forth herein could be made without departing from the scope of the present disclosure. It is intended that the specification and examples be considered as examples. The various descriptions are not necessarily mutually exclusive, as some descriptions can be combined with one or more other descriptions to form combined descriptions.

Described herein are compositions that may be used for coating aluminum, and aluminum alloys, among other metals, including for sealing anodized aluminum and anodized aluminum alloys, among other metals. In an example, a method includes applying a prepared 1 wt % suspension of 5,5-dithiobis-(1,3,4-thiadiazole-2(3H)-thione) and deionized water on aluminum and aluminum alloys, including anodized aluminum and anodized aluminum alloys, among other metals, at room temperature.

Figure 1:
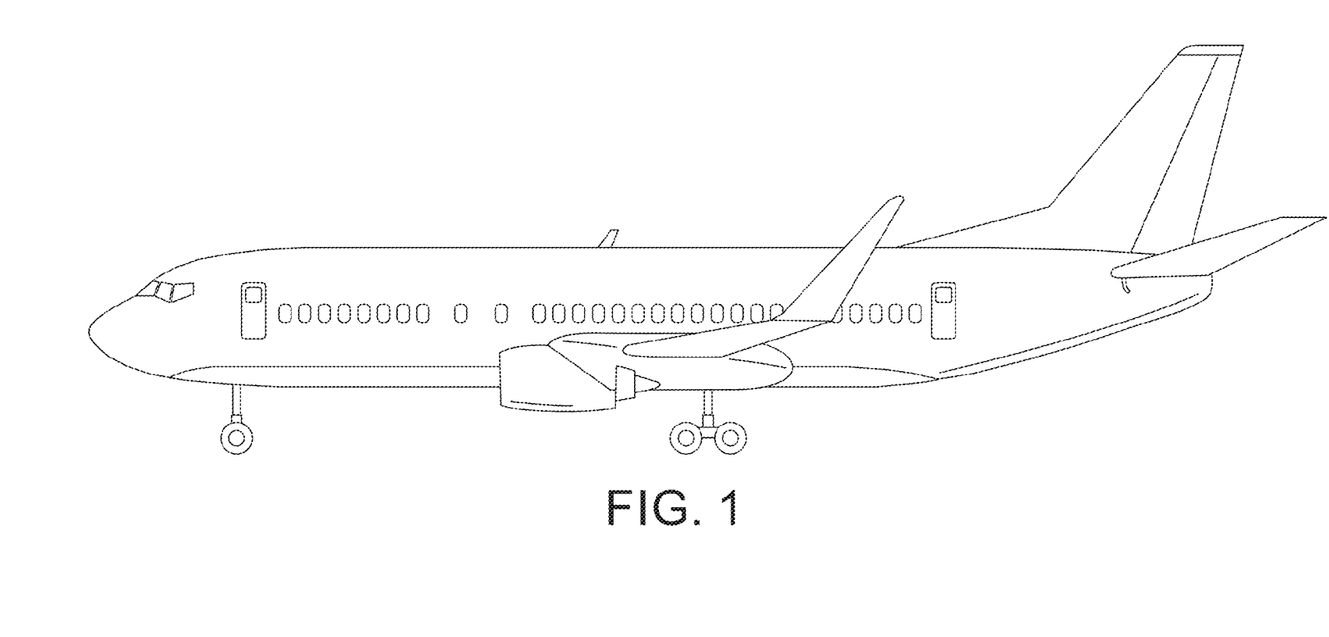
FIG. 1 illustrates one example of an aircraft.

Articles, such as metal surfaces that are subject to environmental corrosion, in particular to oxidative corrosion, such as those of an aircraft shown in FIG. 1, can be protected against such corrosion. A metal surface of such an article may be protected with a barrier oxide film that can be grown on certain metals, including, but not limited to aluminum, niobium, tantalum, titanium, tungsten, and zirconium, by anodizing the metal. Aluminum is unique among these metals in that, in addition to the thin barrier oxide, anodizing aluminum alloys in certain acidic electrolytes produces a thick oxide coating, known as an anodic oxide, containing a high density of microscopic pores. By exposing the anodized coating to hot water for example, at a temperature between about 190° F. to about 212° F., oxide on the surface and within the pores reacts to make a hydrous oxide that has a lower density than the anodic oxide. Because of its lower density, the hydrous oxide occupies a greater volume than the anodic oxide from which it formed. This reaction product fills the pores and makes an anodized layer that is stable under a wide range of atmospheric and environmental conditions. This process of closing the pores after growth of the oxide is called "sealing" and it improves corrosion resistance of the metal.

Figure 2:
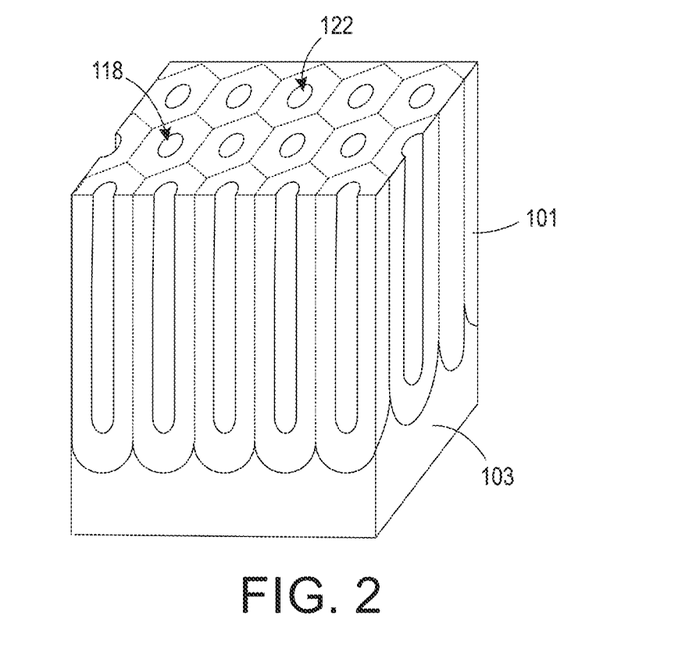
FIG. 2 shows an example structure of an anodized substrate surface.

As shown in FIG. 2, a coating 101, such as a porous anodic oxide coating, may be formed on a substrate 103, which may be aluminum or an aluminum-alloy. Anodic coating 101 may be formed during an anodizing process, as described above, and may have a thickness of about 100 μm. The porous coating 101 may have a cellular structure comprising a plurality of cells 118, which may be hexagonal. Each of the plurality of cells 118 may define at least one of pores 122. For example, one of pores 122 may be disposed within a respective one of the plurality of cells 118 and may extend between an anodic barrier formed on substrate 103 and a surface of the coating 101. The plurality of cells 118 may include uniform, hexagonal cells. Some anodization conditions produce anodic coatings with more disorder, for example, a cellular structure having a distribution of cell size and pore diameter. Cell and pore dimensions depend on anodizing bath composition, temperature, and voltage, among other factors. The plurality of cells 118 may have a diameter in the range of from about 50 nm to about 300 nm, and the at least one of pores 122 may have a diameter in the range of from about ⅓ to about ½ of the cell diameter. The cell population density may be from about 10 per $\mu m^2$ to more than 100 per $\mu m^2$. The aspect ratio may be in the order of 1000:1. For example, a coating 101 grown in sulfuric acid may have a thickness of 20 to 50 μm and may have 20 nm pores.

Figure 3A:
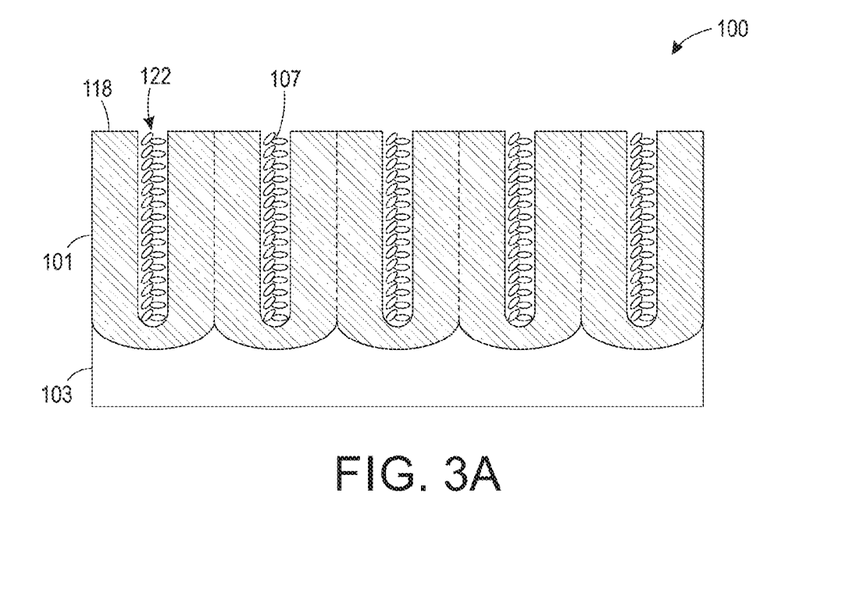
FIG. 3A is a close up view of a portion of FIG. 3B.
Figure 3B:
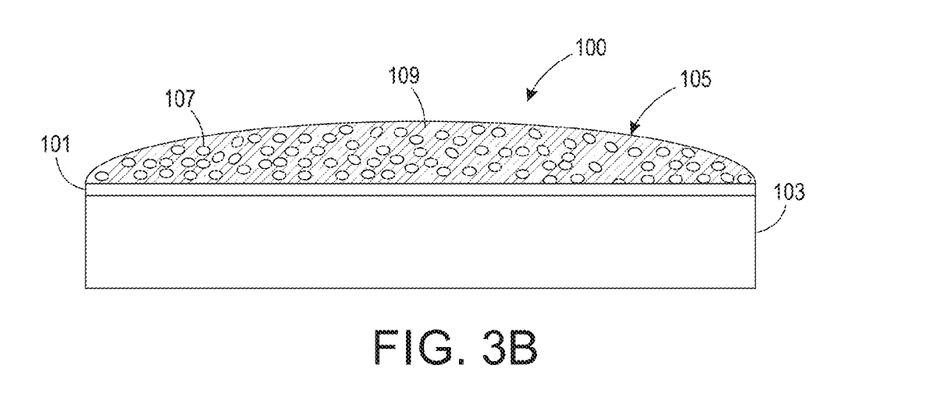

In a method described herein, there is a method for applying a non-chrome corrosion inhibitor composition on an article. The non-chrome corrosion inhibitor composition may be a non-chrome corrosion inhibitor seal. The method can include sealing an article, for example, an anodized substrate. The method can include forming a non-chrome corrosion inhibitor seal on an anodized substrate. As used herein, the term "non-chrome" refers to materials that are chromium free, for example, they may not include chromium (VI). For example, as shown in FIGS. 3A-3B, a corrosion-inhibiting seal may be formed on a surface of substrate 103 of article 100 as a suspension 105, and flows into pores 122. The substrate 103 may be an anodized metal, such as anodized aluminum or an anodized aluminum alloy. The surface of the substrate 103 may be an anodic coating 101, such as an oxide, formed during an anodizing process. The corrosion-inhibiting seal may be an aqueous-based suspension that includes a corrosion-inhibitor in a carrier. The corrosion-inhibitor may be a non-chromium-based corrosion inhibitor, for example, a thiol-containing corrosion inhibitor. The thiol-containing corrosion-inhibitor may be at least one thiol-containing corrosion-inhibitor particle 107, for example, a plurality of thiol-containing corrosion-inhibitor particles. The carrier 109 may be water.

As shown in FIG. 3A, which is a magnified view of a portion of FIG. 3B, the substrate 103 may be an anodized substrate and may include a coating 101. In other words, a surface of the substrate 103 may be formed of an anodic coating. The anodic coating may include the characteristics of the coating 101 described with respect to FIG. 2 above. Thus, the anodic coating may be an oxide coating having a structure that includes a plurality of cells 118, each of the plurality of cells 118 defining at least one of pores 122. The at least one thiol-containing corrosion-inhibitor particle 107 of the suspension 105 may be a plurality of thiol-containing particles. The at least one thiol-containing particle may have a particle diameter that is smaller than a pore diameter of at least one of pores 122. Thus, at least one thiol-containing corrosion-inhibitor particle 107 of suspension 105 may be transported into and disposed in at least one of pores 122 of the anodized substrate's anodic coating. Capillary pressure may provide a driving force that causes the at least one thiol-containing corrosion-inhibitor particle 107 of suspension 105 to be transported with carrier 109 into one or more of pores 122. At least one thiol-containing corrosion-inhibitor particle 107, therefore, may be disposed in a respective one of pore 122. Upon transporting at least one thiol-containing corrosion-inhibitor particle 107 into at least one of pores 122, excess volume of suspension 105 may be removed from the substrate. The substrate may also be exposed to a rinse with either tap water or de-ionized (DI) water. Although some of the carrier 109 may be removed, such as via evaporative air-drying, from the surface, some volume of carrier 109 may remain behind, such as disposed in some of the pores. In other words, although the substrate may be rinsed, some of the thiol-containing suspension may remain in the pores, or at least some of the thiol-containing corrosion-inhibitor particle may remain in the pores.

Unlike conventional seals which are deposited onto anodized substrates at temperatures between about 190° F. and about 212° F., in the method described herein, for example, with respect to forming a non-chrome corrosion inhibitor seal on article 100 in FIGS. 3A-3B, suspension 105 may be applied on the substrate at a temperature in the range of from about room temperature (e.g., ambient temperature, which may be about 68° F. to about 79° F., including about 73° F.) and about 212° F. For example the suspension may be at a temperature in the range of from about room temperature and about 212° F. when the suspension is applied on the substrate. That is, the suspension 105 may be at room temperature when it is applied on the substrate, for example, when the substrate is immersed in the suspension, and the substrate may also be at room temperature.

As shown in FIG. 3A, at least one thiol-containing corrosion-inhibitor particle 107 may have a diameter such that a plurality of the at least one corrosion-inhibitor particle 107 are transported into and disposed in one or more of pore 122. Accordingly, the at least one thiol-containing corrosion-inhibitor particle 107, as described above, may be a nano-sized particle that is smaller than a pore diameter, the pore diameter being about ⅓ to about ½ of the cell diameter, and the cell diameter being in a range of from about 50 nm to about 300 nm. While not limited to any particular theory, it is believed that by transporting the at least one thiol-containing corrosion-inhibitor particle 107 into the pore, the particle prevents corrosion reactions between the substrate and materials in the environment by electrochemically reacting to resist corrosion.

Figure 4:
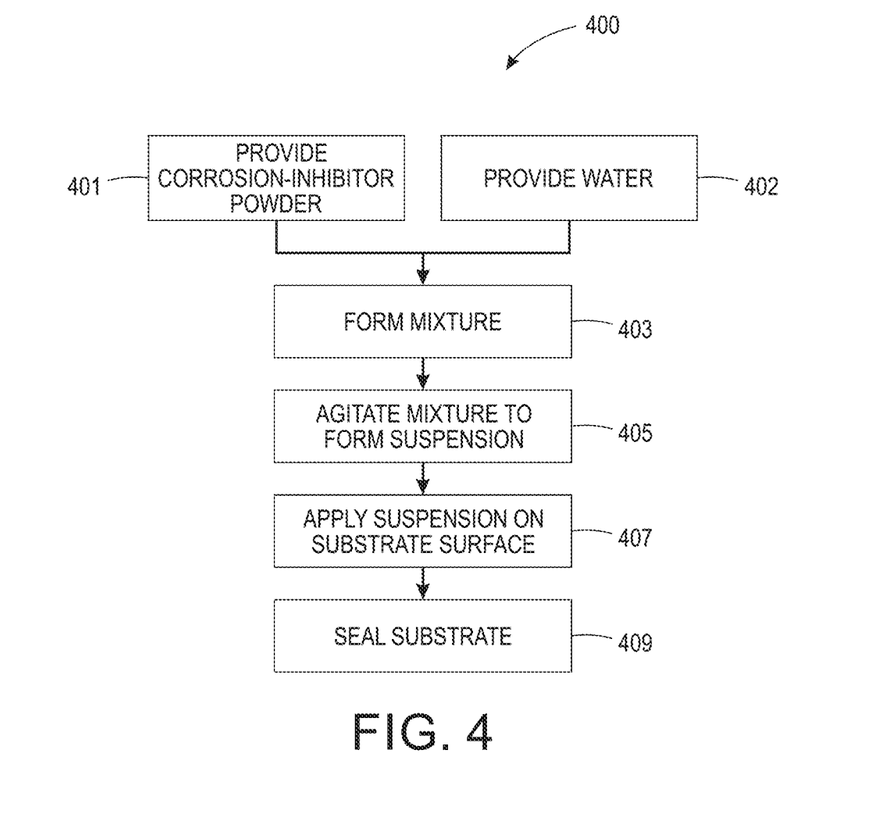
FIG. 4 is a flowchart depicting a method of making a corrosion inhibiting seal.

The corrosion-inhibitor particles used in a non-chrome corrosion inhibitor seal may be derived from crude non-chrome corrosion inhibitor particles, for example, bulk non-chrome corrosion inhibitor particles formed according to known synthesis routes or available as commercial powders. For example, FIG. 4 is a flow-chart that describes a method for preparing an aqueous-based, non-chrome corrosion inhibitor seal composition. At 401, a corrosion inhibitor is provided, for example, in powder form (although not limited to powder form). The corrosion inhibitor may be a disulfide/dithiol compound, for example, an insoluble thiol or sulfide containing organic molecule. The thiol or sulfide containing organic molecule may be a polydisulfide, such as a mercaptan-terminated polysulfide of dimercaptothiadiazole (DMcT). For example, the polydisulfide may be represented by formula I:

(I)

where n is 1 or 2, and polymers thereof.

Accordingly, the crude corrosion inhibitor may be 5,5-dithiobis-(1,3,4-thiadiazole-2(3H)-thione), available as VANLUBE® 829 (Vanderbilt Chemicals, LLC, Norwalk, Conn.), which has a structure represented by formula II:

(II)

At 402, a carrier such as water is provided. The water may be de-ionized (DI) water. Other carriers capable of mixing with the corrosion inhibitor to form a suspension may be used. At 403, the water and corrosion-inhibitor powder are combined to form a mixture. An exemplary mixture includes 0.2 wt % to 10 wt % of 5,5-dithiobis-(1,3,4-thiadiazole-2 (3H)-thione) in water. Another exemplary mixture comprises a 1 wt % to 3 wt % suspension of 5,5-dithiobis-(1,3, 4-thiadiazole-2(3H)-thione) in water. Another exemplary mixture comprises 1 wt % of 5,5-dithiobis-(1,3,4-thiadiazole-2(3H)-thione) in water. Other dithiol-based corrosion inhibitors may be used, such as INHIBICOR™ 1000 (available from WPC Technologies).

At 405, at least one particle, such as the at least one thiol-containing corrosion-inhibitor particle 107 is formed by agitating the mixture, such as via mechanical agitation. The mixture may be agitated for a sufficient time such that the crude corrosion inhibitor is formed into at least one particle, and the at least one particle's diameter is reduced such that the particle is a nano-sized particle. While not limited to any particular theory, it is believed that by agitating the crude corrosion-inhibitor in water, the crude corrosion-inhibitor is reduced into particles that are small enough to remain in suspension.

At 407, the suspension may be applied onto a surface of a substrate, for example, a surface of substrate 103, which may be an anodized substrate as described above. The suspension may be applied at a temperature in the range of from about room temperature to about 212° F. Excess amount of suspension may be removed, such as by evaporating away the water via air-drying, or via rinsing with tap or DI-water. Some of the water from the suspension may remain on the substrate, for example, in the pores of an anodic coating of an anodized substrate. The particles of the suspension may be reduced in size, for example, during step 405, such that at least one particle has a diameter that is smaller than a diameter of a pore. Accordingly, at least one particle may be transported into and disposed in at least one pore to seal the substrate as in step 409. The suspension may be applied to a substrate via immersion, for example, tank immersion, or by any appropriate method, such as dip coating, spin coating, spray coating, or brushing on.

In addition to the corrosion-inhibiting particle and water, suspension formulations of the non-chrome, corrosion inhibiting seal can contain other materials. For example, a colorant or and any other material that adds useful properties to the seal, or at least does not reduce the functionality of the seal, can be included in the suspension in amounts that are known to those of skill in the art of seals for anodic coatings of anodized substrates.

It is believed that the present methods can be used to prevent or reduce corrosion for any corrodible metal. The methods and compositions are particularly useful on aluminum alloys such as 2024-T3 aluminum.

EXAMPLES

Example 1

Method of Making a Disulfide/Dithiol Compound

A 1 wt % composition of 5,5-dithiobis-(1,3,4-thiadiazole-2(3H)-thione) was prepared from VANLUBE® 829 in deionized water. This composition was processed on a paint shaker using glass beads to help incorporate the VANLUBE® into the water. A high speed shear mixer or a centrifugal planetary mixer would work too. A majority of the VANLUBE® did not appear to dissolve, and a portion was reduced to nano-sized particles which stayed in suspension.

Example 2

Use of a Disulfide/Dithiol Composition to increase Corrosion Resistance of Aluminum and its Alloys Twelve (12) 2024-T3 aluminum panels (3"×6"×0.032") were used as test specimens.

Three of these panels were chromium conversion coated to use as controls.

Three panels were put through an aluminum cleaning processing line (solvent wipe, alkaline clean and deoxidized) prior to immersion in the 1 wt % suspension of Example 1. Immersion time was 5 minutes at room temperature. These panels were then rinsed.

Three panels were wet abraded with Scotch-Brite 7447 pads, rinsed and allowed to dry.

The 1 wt % suspension of Example 1 was then spray applied to the panels. The panels were kept wet with the suspension for 2 minutes at room temperature. These panels were then allowed to air dry.

Three panels were solvent wiped for use as control panels.

Figure 5A:
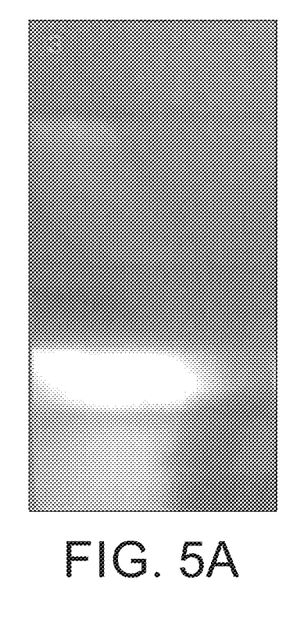
FIGS. 5A-5C are images of test panels used in a first example before salt spray exposure.
Figure 5B:
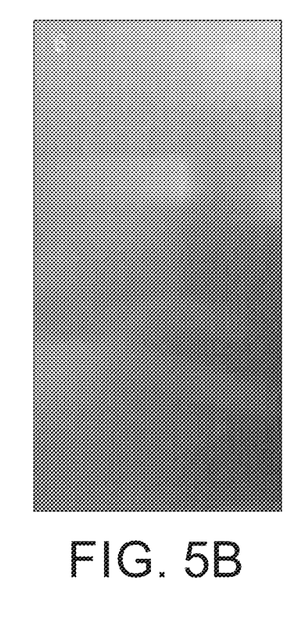
Figure 5C:
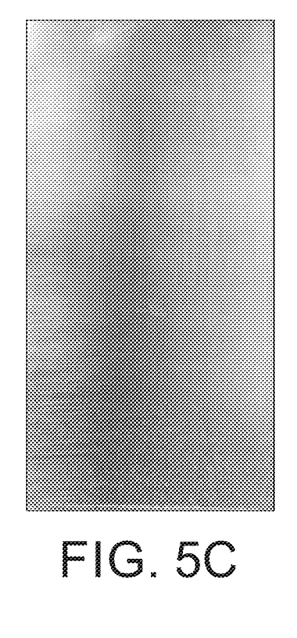

FIGS. 5A-5C are images of test panels described above before salt spray exposure. A chromium conversion coated panel is shown in FIG. 5A, a panel that was immersed in the 1 wt % suspension of Example 1 and rinsed is shown in FIG. 5B, and a panel on which the 1 wt % suspension from Example 1 was spray-applied is shown in FIG. 5C. The use of a disulfide/dithiol compound (even in water), while not as effective as hexavalent chrome, improved the corrosion resistance of aluminum and its alloys.

The panels were then placed into neutral salt spray per ASTM B-117 for testing. After 4 hours of exposure the chromium-treated panels were unaffected. The panels which had been abraded performed better than the immersed and rinsed panels or the bare unprocessed panels.

Figure 6A:
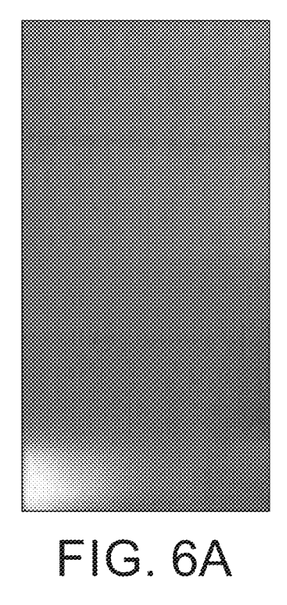
FIGS. 6A-6D are images of representative test panels used in a first example after 4 hours of neutral salt spray testing.
Figure 6B:
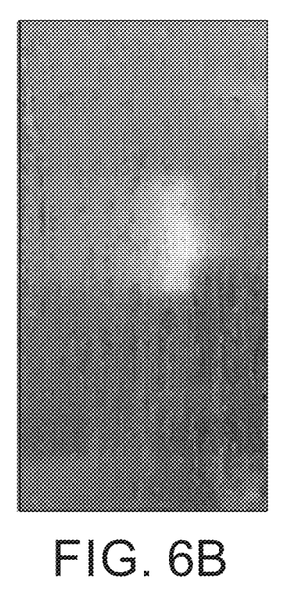
Figure 6C:
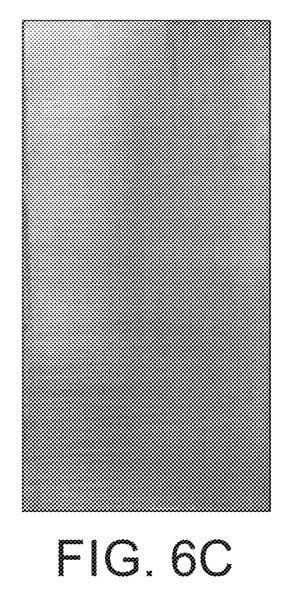
Figure 6D:
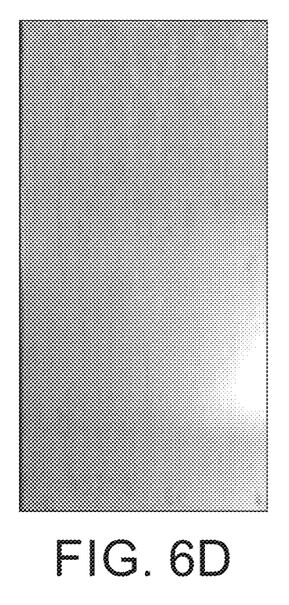

FIGS. 6A-6D are images of representative test panels described above after 4 hours of neutral salt spray testing described above. A chromium conversion coated panel is shown in FIG. 6A, a panel that was immersed in the 1 wt % suspension of Example 1 and rinsed is shown in FIG. 6B, a panel on which the 1 wt % suspension from Example 1 was spray-applied is shown in FIG. 6C, and a bare unprocessed panel of 2024-T3 aluminum is shown in FIG. 6D.

Accordingly, it was observed that the use of a disulfide/dithiol compound (even in water), while not as effective as hexavalent chrome, improved the corrosion resistance of aluminum and its alloys.

Example 3

Comparison Between 5 wt % Sodium Dichromate Compound and 1% Disulfide/Dithiol Compound as a Seal for Anodized Aluminum Twelve (1) 2024-T3 aluminum panels (3"×6"×0.032") were used as test specimens. The test panels were anodized simultaneously in one batch.

Three of these panels were sealed in a hot (200° F.) 5% sodium dichromate suspension for 5 minutes. Three of the panels were sealed in hot (200° F.) DI water for 5 minutes. Three of the panels were sealed in room temperature 1 wt % suspension of Example 1 for 5 minutes. Three of the panels were sealed in hot (200° F.) 1 wt % suspension of Example 1 for 5 minutes.

Figure 7A:
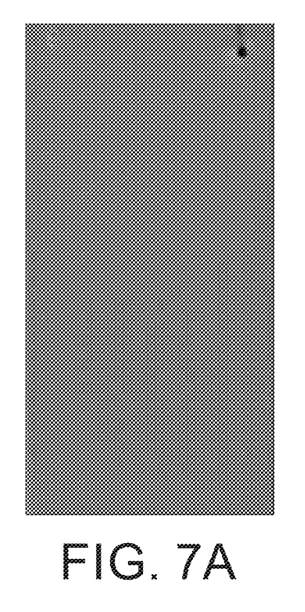
FIGS. 7A-7D are images of test panels used in another example before salt spray exposure.
Figure 7B:
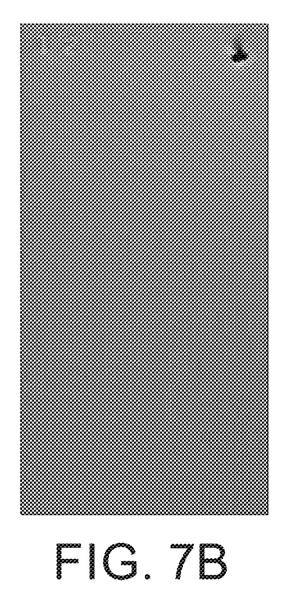
Figure 7C:
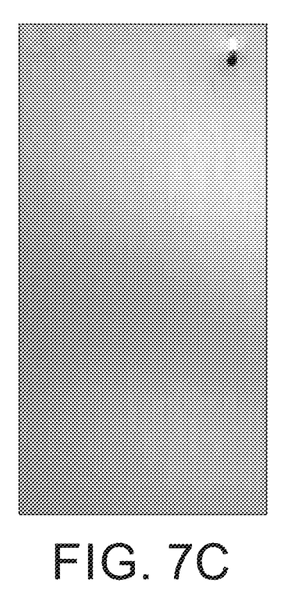
Figure 7D:
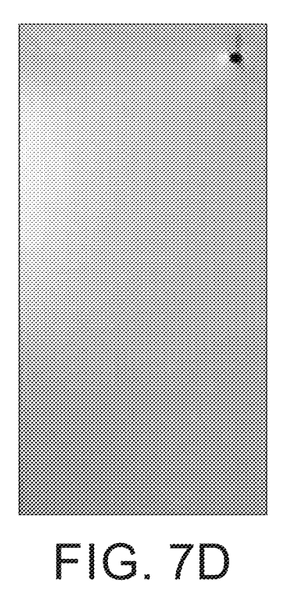

FIGS. 7A-7D are images of representative ones of the test panels before salt spray exposure. A panel that was sealed with the hot dichromate suspension is shown in FIG. 7A, a panel that was sealed with hot DI water is shown in FIG. 7B, a panel that was sealed with the room temperature 1 wt % suspension from Example 1 is shown in FIG. 7C, and a panel that was sealed with the hot 1 wt % suspension from Example 1 is shown in FIG. 7D.

The panels were then placed into neutral salt spray per ASTM B-117 for testing. After 336 hours (2 weeks) of exposure, all of the panels were unaffected.

Figure 8A:
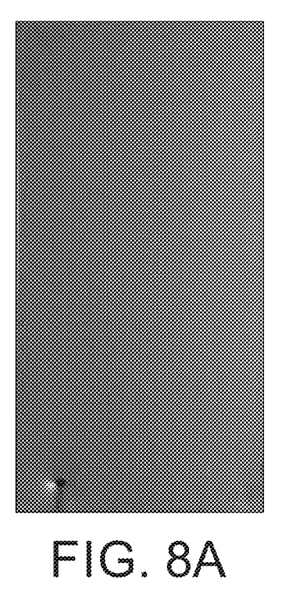
FIGS. 8A-8D are images of representative test panels used in another example after 336 hours of neutral salt spray testing.
Figure 8B:
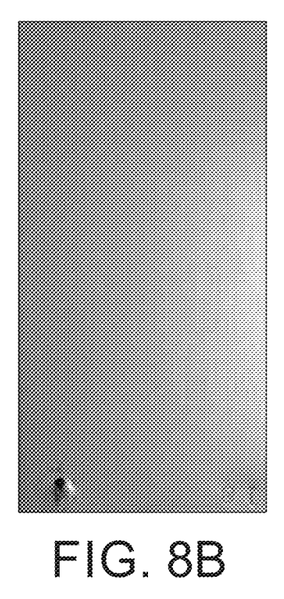
Figure 8C:
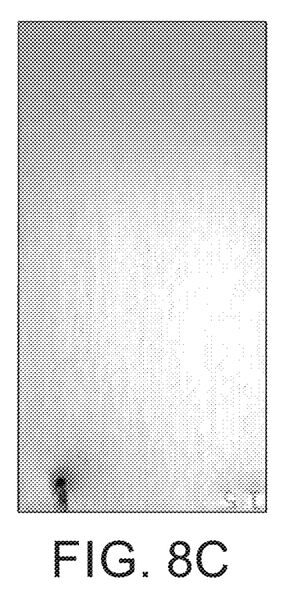
Figure 8D:
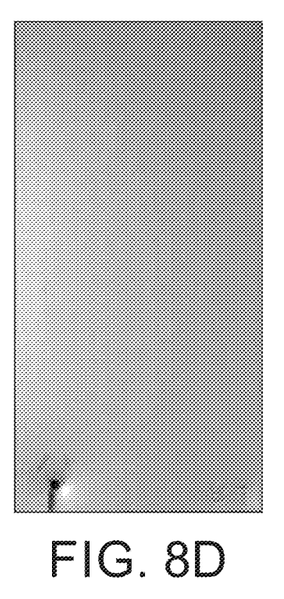

FIGS. 8A-8D are images of representative ones of the test panels after the 336 hours of neutral salt spray testing. A chromium conversion coated panel is shown in FIG. 8A, a panel that was immersed in hot DI water is shown in FIG. 8B, a panel on which room temperature 1 wt % suspension from Example 1 was applied is shown in FIG. 8C, and a panel on which hot 1% suspension of Example 1 was applied is shown in FIG. 8D.

It was observed that the use of a disulfide/dithiol compound in water, as a seal for anodized aluminum meets the corrosion resistance specification of 336 hours.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or descriptions of the present teachings. It will be appreciated that structural components and/or processing stages may be added or existing structural components and/or processing stages may be removed or modified.

Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one " is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated descriptions. Finally, "exemplary" indicates the description is used as an example, rather than implying that it is an ideal.

Other implementations will be apparent to those skilled in the art from consideration of the specification and practice of what is described herein. It is intended that the specification and examples be considered as exemplary only, with a true scope and spirit of the implementations being indicated by the following claims.

What is claimed is:

1. A method for sealing an article with a non-chrome corrosion inhibitor seal, comprising:
   applying an aqueous-based suspension on a surface of an anodized substrate,
   wherein the aqueous-based suspension consists of 0.2 wt % to 3 wt % of 5,5-dithiobis-(1,3,4-thiadiazole-2(3H)-thione) in water,
   wherein the surface of the anodized substrate comprises an anodic oxide coating, wherein the anodic oxide coating comprises a plurality of cells, each of the plurality of cells defining at least one pore,
   wherein a temperature of the aqueous-based suspension, when it is applied on the anodized substrate, is in the range of from about 68° F. to about 79° F., and
   wherein the 5,5-dithiobis-(1,3,4-thiadiazole-2(3H)-thione) comprises nano-sized particles; and
   transporting at least one of the particles into the at least one pore.

2. The method of claim 1, wherein at least one of the particles has a particle diameter that is smaller than a pore diameter of the at least one pore.

3. The method of claim 1, wherein each of the plurality of cells comprise a cell diameter in a range of from about 50 nm to about 300 nm.

4. The method of claim 1, wherein each of the plurality of cells comprises a cell diameter, and wherein the at least one pore comprise a pore diameter that is about ⅓ to about ½ of the cell diameter.

5. The method of claim 1, further comprising:
   transporting a plurality of the particles into each of a plurality of pores.

6. The method of claim 1, wherein at least one of the particles is transported into the at least one of the pore by capillary pressure.

7. The method of claim 1, wherein the applying comprises at least one of immersing the substrate into a volume of the suspension or brushing the suspension onto the surface.

8. The method of claim 1, wherein the anodized substrate comprises anodized aluminum or an anodized aluminum alloy.

9. The method of claim 1, wherein the suspension consists of 1 wt % to 3 wt % of 5,5-dithiobis-(1,3,4-thiadiazole-2 (3H)-thione) in water.

10. The method of claim 1, further comprising forming a mixture consisting of the 5,5-dithiobis-(1,3,4-thiadiazole-2 (3H)-thione) and the water, and agitating the mixture to form the aqueous suspension.

11. The method of claim 10, wherein the 5,5-dithiobis-(1,3,4-thiadiazole-2(3H)-thione) comprises crude 5,5-dithiobis-(1,3,4-thiadiazole-2(3H)-thione), and the agitating of the mixture reduces a size of the crude 5,5-dithiobis-(1,3,4-thiadiazole-2(3H)-thione) to form the nano-sized particles.

12. The method of claim 1, further comprising removing excess volume of the aqueous-based suspension from the anodized substrate.

13. The method of claim 1, wherein the transporting of the at least one of the particles comprises a plurality of the particles.

14. The method of claim 1, wherein the plurality of the particles fills the at least one pore.

15. A method for sealing an article with a non-chrome corrosion inhibitor seal, comprising:
   applying an aqueous-based suspension on a surface of an anodized substrate,
   wherein the aqueous-based suspension consists of 5,5-dithiobis-(1,3,4-thiadiazole-2(3H)-thione) in water,
   wherein a temperature of the aqueous-based suspension, when it is applied on the anodized substrate, is in the range of from about 68° F. to about 79° F.,
   wherein the 5,5-dithiobis-(1,3,4-thiadiazole-2(3H)-thione) comprises nano-sized particles.

16. A method for sealing an article with a non-chrome corrosion inhibitor seal, comprising:
   applying an aqueous-based suspension on a surface of an anodized substrate,
   wherein the aqueous-based suspension consists of 5,5-dithiobis-(1,3,4-thiadiazole-2(3H)-thione) in water.

17. The method of claim 16, wherein the surface of the anodized substrate comprises an anodic oxide coating, wherein the anodic oxide coating comprises a plurality of cells, each of the plurality of cells defining at least one pore.

18. The method of claim 16, wherein the 5,5-dithiobis-(1,3,4-thiadiazole-2(3H)-thione) comprises nano-sized particles.

19. The method of claim 18, further comprising transporting a plurality of the particles into each of a plurality of pores.

20. The method of claim 16, further comprising removing excess volume of the aqueous-based suspension from the anodized substrate.

21. The method of claim 16, further comprising forming a mixture consisting of the 5,5-dithiobis-(1,3,4-thiadiazole-2(3H)-thione) and the water, and agitating the mixture to form the aqueous suspension.

* * * * *